United States Patent
Rofougaran

(10) Patent No.: US 8,032,096 B2
(45) Date of Patent: Oct. 4, 2011

(54) METHOD AND SYSTEM FOR COMPENSATING FOR ANTENNA PULLING

(75) Inventor: Ahmadreza Rofougaran, Newport Coast, CA (US)

(73) Assignee: Broadcom Corporation

( * ) Notice: Subject to any disclaimer, the term of this patent is extended or adjusted under 35 U.S.C. 154(b) by 784 days.

(21) Appl. No.: 11/536,667

(22) Filed: Sep. 29, 2006

(65) Prior Publication Data

US 2008/0081578 A1   Apr. 3, 2008

(51) Int. Cl.
*H04B 1/04* (2006.01)
(52) U.S. Cl. .................................................. 455/127.1
(58) Field of Classification Search ......... 455/73–575.9, 455/69
See application file for complete search history.

(56) References Cited

U.S. PATENT DOCUMENTS

| | | | |
|---|---|---|---|
| 5,488,737 A * | 1/1996 | Harbin et al. .............. 455/562.1 |
| 5,530,923 A * | 6/1996 | Heinonen et al. ............. 455/126 |
| 5,628,055 A * | 5/1997 | Stein .......................... 455/575.1 |
| 5,678,209 A * | 10/1997 | Strakovsky .................... 455/126 |
| 5,929,776 A * | 7/1999 | Warble et al. ................ 340/7.32 |
| 6,157,616 A * | 12/2000 | Whitehead .................... 370/252 |
| 6,642,744 B2 * | 11/2003 | Or-Bach et al. ................. 326/39 |
| 2001/0036843 A1 * | 11/2001 | Thompson .................... 455/562 |
| 2004/0131014 A1 * | 7/2004 | Thompson et al. ........... 370/230 |
| 2004/0164803 A1 * | 8/2004 | Canyon et al. ................ 330/285 |
| 2004/0196813 A1 * | 10/2004 | Ofek et al. .................... 370/334 |
| 2005/0009557 A1 * | 1/2005 | Watanabe et al. .......... 455/550.1 |
| 2005/0147076 A1 * | 7/2005 | Sadowsky et al. ............ 370/343 |
| 2005/0266811 A1 | 12/2005 | Weiss |
| 2007/0004349 A1 * | 1/2007 | Ranganathan et al. .... 455/127.1 |

FOREIGN PATENT DOCUMENTS

| KR | 20010078104 | 8/2001 |
| KR | 20030006051 | 1/2003 |
| WO | WO 2006/029082 | 3/2006 |

OTHER PUBLICATIONS

European Search Report for European Patent Application Serial No. 07007616.1-2215, dated May 19, 2009.

* cited by examiner

*Primary Examiner* — Lester Kincaid
*Assistant Examiner* — Steven Lim
(74) *Attorney, Agent, or Firm* — McAndrews, Held & Malloy, Ltd.

(57) ABSTRACT

Methods and systems for wireless communication are disclosed herein and may include sampling a portion of a transmitted wireless signal which gets coupled to receiver circuitry in a receive chain during transmission via an antenna. The DC level corresponding to the sampled portion of the transmitted wireless signal may be measured. The transmit power corresponding to the transmitted wireless signal may be adjusted based on the measured DC level. The antenna may include a mobile antenna, which may be coupled to a wireless terminal. The sampled portion of the transmitted wireless signal may be buffered. The buffered portion of the transmitted wireless signal may be multiplied with the transmitted wireless signal to generate a multiplied signal, and the DC level may be measured using the multiplied signal. A control signal may be generated based on the measured DC level and, for example, a look-up table.

9 Claims, 6 Drawing Sheets

METHOD AND SYSTEM FOR COMPENSATING FOR ANTENNA PULLING

CROSS-REFERENCE TO RELATED APPLICATIONS/INCORPORATION BY REFERENCE

This application also makes reference to:
U.S. application Ser. No. 11/536,678, filed Sep. 29, 2006;
U.S. application Ser. No. 11/536,682, filed Sep. 29, 2006;
U.S. application Ser. No. 11/536,650, filed Sep. 29, 2006;
U.S. application Ser. No. 11/536,644, filed Sep. 29, 2006;
U.S. application Ser. No. 11/536,676, filed Sep. 29, 2006;
U.S. application Ser. No. 11/536,659, filed Sep. 29, 2006;
U.S. application Ser. No. 11/536,673, filed Sep. 29, 2006;
U.S. application Ser. No. 11/536,679, filed Sep. 29, 2006;
U.S. application Ser. No. 11/536,670, filed Sep. 29, 2006;
U.S. application Ser. No. 11/536,672, filed Sep. 29, 2006;
U.S. application Ser. No. 11/536,648, filed Sep. 29, 2006;
U.S. application Ser. No. 11/536,669, filed Sep. 29, 2006;
U.S. application Ser. No. 11/536,666, filed Sep. 29, 2006;
U.S. application Ser. No. 11/536,675, filed Sep. 29, 2006;
U.S. application Ser. No. 11/536,685, filed Sep. 29, 2006;
U.S. application Ser. No. 11/536,645, filed Sep. 29, 2006;
U.S. application Ser. No. 11/536,655, filed Sep. 29, 2006;
U.S. application Ser. No. 11/536,660, filed Sep. 29, 2006;
U.S. application Ser. No. 11/536,657, filed Sep. 29, 2006;
U.S. application Ser. No. 11/536,662, filed Sep. 29, 2006;
U.S. application Ser. No. 11/536,688, filed Sep. 29, 2006;
U.S. application Ser. No. 11/536,651, filed Sep. 29, 2006;
U.S. application Ser. No. 11/536,656, filed Sep. 29, 2006, and
U.S. application Ser. No. 11/536,663, filed Sep. 29, 2006.

The above stated applications are hereby incorporated herein by reference in their entirety.

FIELD OF THE INVENTION

Certain embodiments of the invention relate to processing wireless signals. More specifically, certain embodiments of the invention relate to a method and system for compensating for antenna pulling.

BACKGROUND OF THE INVENTION

For many current wireless communication systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, code division multiple access (CDMA) based systems, time division multiple access (TDMA) based systems, wireless local area network (WLAN) systems, wideband CDMA (WCDMA), and orthogonal frequency division multiplexing (OFDM) based systems, such as IEEE 802.11 a/g, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from the shift underway from current voice-based services to next-generation wireless multimedia services that provide integrated voice, video, and data transmission.

The utilization of multiple transmit and/or receive antennas in wireless communication systems is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of M-1 interferers. Accordingly, N signals may be simultaneously transmitted in the same bandwidth using N transmit antennas, with the transmitted signal then being separated into N respective signals by way of a set of N antennas deployed at the receiver. This type of systems may be referred to as multiple-input multiple-output (MIMO) systems. One attractive aspect of multi-antenna systems, in particular MIMOs, is the significant increase in system capacity which may be achieved by utilizing these transmission configurations. For a fixed overall transmitted power the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handheld devices, has been limited by the increased cost that results from the increased size, complexity, and power consumption. Furthermore, operation of the wireless handheld device may be significantly affected by the operating conditions of the wireless device antenna. For example, the receive and/or transmit characteristics of the antenna may change when a hand is placed on the antenna. In such instances, antenna pulling may result, which causes degradation of performance of the wireless handheld device.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

A system and method for compensating for antenna pulling, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for compensating for antenna pulling and may comprise sampling a portion of a transmitted wireless signal which gets coupled to receiver circuitry in a receive chain. The wireless signal may be transmitted via an antenna. The DC level corresponding to the sampled portion of the transmitted wireless signal may be measured. The transmit power corresponding to the transmitted wireless signal may be adjusted based on the measured DC level. The antenna may comprise a mobile antenna. The sampled portion of the transmitted wireless signal may be buffered. The buffered portion of the transmitted wireless signal may be multiplied with the transmitted wireless signal to generate a multiplied signal, and the DC level may be measured using the multiplied signal. A control signal may be generated based on the measured DC level and, for example, a look-up table. The look-up table may comprise a user-customizable look-up table. If the transmitted wireless signal comprises a CDMA signal, a WCDMA signal, a HSDPA signal, and/or a HSUDPA signal, the portion of the transmitted wireless signal may be sampled simultaneously with transmitting the wireless signal via the antenna and receiving a second wireless signal via the antenna. If the transmitted wireless signal comprises a TDMA signal, a WLAN signal, a WiMax signal, a GSM signal, a GPRS signal, and/or an EDGE signal, the portion of the transmitted wireless signal may be sampled via second receiver circuitry in a second receive chain.

Figure 1:
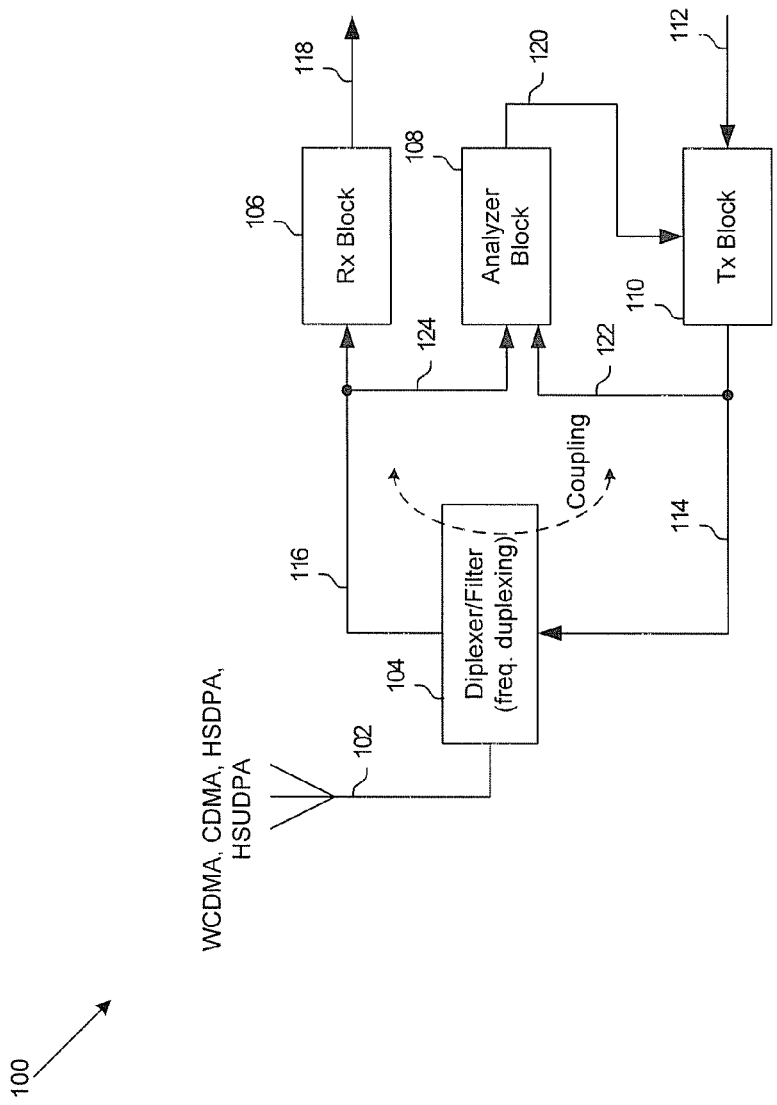
FIG. 1 is a block diagram of an exemplary wireless transceiver utilizing frequency duplexing and antenna pulling compensation, in accordance with an embodiment of the invention.

FIG. 1 is a block diagram of an exemplary wireless transceiver utilizing frequency duplexing and antenna pulling compensation, in accordance with an embodiment of the invention. Referring to FIG. 1, the wireless transceiver 100 may comprise an antenna 102, a diplexer 104, a RF receive (Rx) block 106, a RF transmit (Tx) block 110, and an analyzer block 108.

The Rx block 106 may comprise suitable logic, circuitry and/or code that may be adapted to amplify and convert the received analog RF signal 116 down to baseband frequency. In this regard, the Rx block 106 may comprise, for example, an analog-to-digital (A/D) converter that may be utilized to digitize the received analog baseband signal, as well as voltage controlled oscillator, a mixer, and/or a low pass filter. After the received signal 116 is downconverted to baseband frequency, the Rx block 106 may further process the downconverted signal and generate an output signal 118.

The Tx block 110 may comprise suitable logic, circuitry, and/or code that may be adapted to process an input signal 112 by utilizing, for example, filtering, amplification, and/or analog-to-digital (A/D) conversion operations. In this regard, the Tx block 110 may generate an output signal 114, which may be communicated to the antenna 102 for transmitting.

The diplexer 104 may comprise suitable circuitry, logic and/or code and may be adapted to provide frequency duplexing to the Rx block 106 and the Tx block 110. In one embodiment of the invention, the diplexer 104 may comprise a filter, which may be adapted to simultaneously receive signal 116 via antenna 102 at a first frequency and transmit signal 114 via antenna 102 at a second frequency.

The analyzer block 108 may comprise suitable circuitry, logic and/or code and may be adapted to analyze effects of antenna pulling and/or coupling within the transceiver system 100. For example, the analyzer block 108 may utilize portions of the transmitted signal 114 received by the Rx block 106 as a result of coupling, as well as the transmitted signal 114 to generate a control signal 120. The control signal 120 may be communicated to the Tx Block 110, and the Tx block 110 may utilize the control signal 120 to adjust one or more transmit characteristics to compensate for the effects of antenna pulling and/or signal coupling. For example, the Tx block 110 may utilize the control signal 120 to adjust a power amplifier current of power amplifier circuitry within the Tx block 110, thereby adjusting the power of the transmitted output signal 114.

In operation, the wireless transceiver 100 may be utilized to transmit and receive a CDMA signal, a WCDMA signal, a HSDPA signal, and/or a HSUDPA signal simultaneously. For example, a CDMA/WCDMA/HSDPA/HSUDPA signal 116 may be received via the antenna 102 and the diplexer 104 at a frequency of 1.9 GHz. At the same time, the Tx block may generate an output signal 114 which may be transmitted via the diplexer 104 and the antenna 102 at a frequency of 1.7 GHz.

During an exemplary signal receive cycle, a signal 116 may be received via the antenna 102 and the diplexer 104 and may be communicated to the Rx block 106 for processing. For example, the Rx block 106 may comprise one or more RF processing blocks that may downconvert, filter, amplify, and/or digitize the received signal 116 to generate an output signal 118. Similarly, the Tx block 110 may receive an input signal 112. The Tx block 110 may filter, upconvert, and/or amplify the input signal 112 to generate a transmit signal 114. The transmit signal 114 may be communicated to the diplexer 104 and then may be transmitted by the antenna 102.

The received signal 116 and the transmitted signal 114 may also be communicated to the analyzer block 108. Because of coupling effects between the Rx block 106 and the Tx block 110 via the diplexer 104, portions of the transmit signal 114 may be communicated to the Rx block 106 via the diplexer 104. In this regard, because of the effects of Tx/Rx coupling, portions of the transmitted signal 114 may be communicated to the analyzer block 108 via path 124. In addition, the transmitted signal 114 may be communicated to the analyzer block 108 via path 122.

In instances when the antenna 102 and its associated power amplifier (PA) circuitry within the Tx block 110 are operating properly, a known DC bias may be generated by the analyzer block 108 using the transmit signal 114 communicated via path 122 and portions of the transmitted signal communicated to the analyzer block 108 via path 124. The DC bias generated by the analyzer block 108 may be representative of the coupling between the Rx block 106 and the Tx block 110 via the antenna 102 and the diplexer 104. In instances where, for example, a hand is placed on the antenna 102 and pulling occurs, the DC bias generated by the analyzer block 108 may change. Accordingly, the analyzer block 108 may be adapted to dynamically monitor the DC bias. The analyzer block 108 may then generate a control signal 120 which may be communicated to the Tx block 110. The Tx block 110 may use the generated control signal 120 to adjust power amplifier circuitry, and/or other circuitry within the Tx block 110, to maintain a specified DC bias in order to compensate for the antenna pulling effect. For example, in instances when the analyzer block 108 detects a change in the DC bias, the analyzer block may generate a control signal 120 which may be used by the Tx block 110 to adjust the amount of current supplied to the power amplifier circuitry, thereby increasing or decreasing transmit power, so that a desired DC bias may be achieved and the effects of pulling on the antenna 102 may be minimized.

Figure 2:
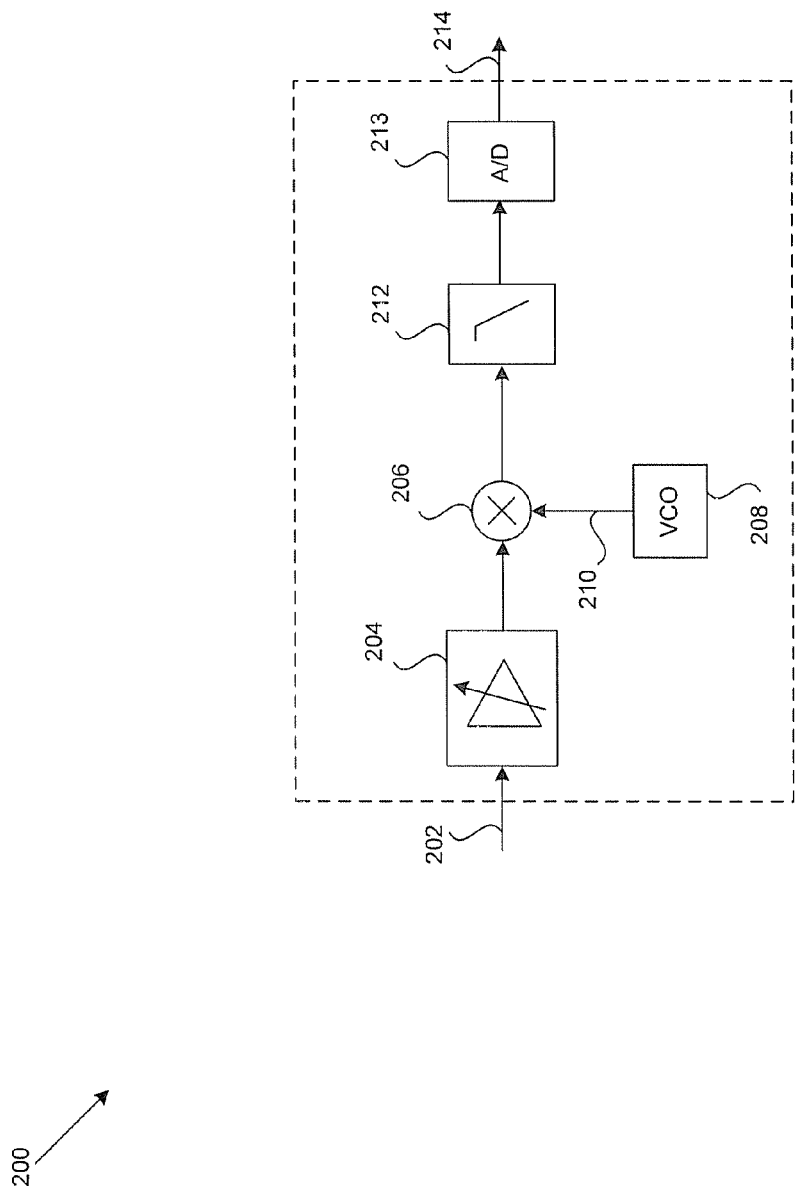
FIG. 2 is a block diagram of a radio frequency (RF) processing block that may be utilized in accordance with an aspect of the invention.

FIG. 2 is a block diagram of a radio frequency (RF) processing block that may be utilized in accordance with an aspect of the invention. Referring to FIG. 2, the RF processing block 200 may be used to process received signals within, for example, the Rx block 106 of FIG. 1. The RF processing block 200 may comprise suitable logic, circuitry, and/or code and may be adapted to amplify and convert a received analog RF signal down to baseband and then digitize it. In an exemplary aspect of the invention, the RF processing block 200 may comprise an LNA 204, a voltage controlled oscillator (VCO) 208, a mixer 206, a low pass filter (LPF) 212, and an analog-to-digital converter (A/D) 213. The LNA 204 may be adapted to receive an RF signal 202 and amplify it based on a determined gain level. The VCO 208 may comprise suitable logic, circuitry, and/or code and may be adapted to output a signal of a specific frequency, which may be pre-determined, or controlled, by a voltage signal input to the VCO.

The VCO signal 210 may be mixed by the mixer 206 with the amplified signal received from the LNA 204. The LPF 212 may comprise suitable logic, circuitry, and/or code and may be adapted to receive the mixed signal from the mixer 206. The frequencies of the mixed signal may be limited by the LPF 212 to a determined range of frequencies up to a certain upper frequency limit, and the LPF 212 may output that range of frequencies as a baseband signal to the A/D 213. The A/D converter 213 may comprise suitable logic, circuitry, and/or code that may be adapted to receive the limited analog baseband signal from the LPF 212 and output a digital signal 214, which may sample the analog signal at a pre-defined rate.

Figure 3:
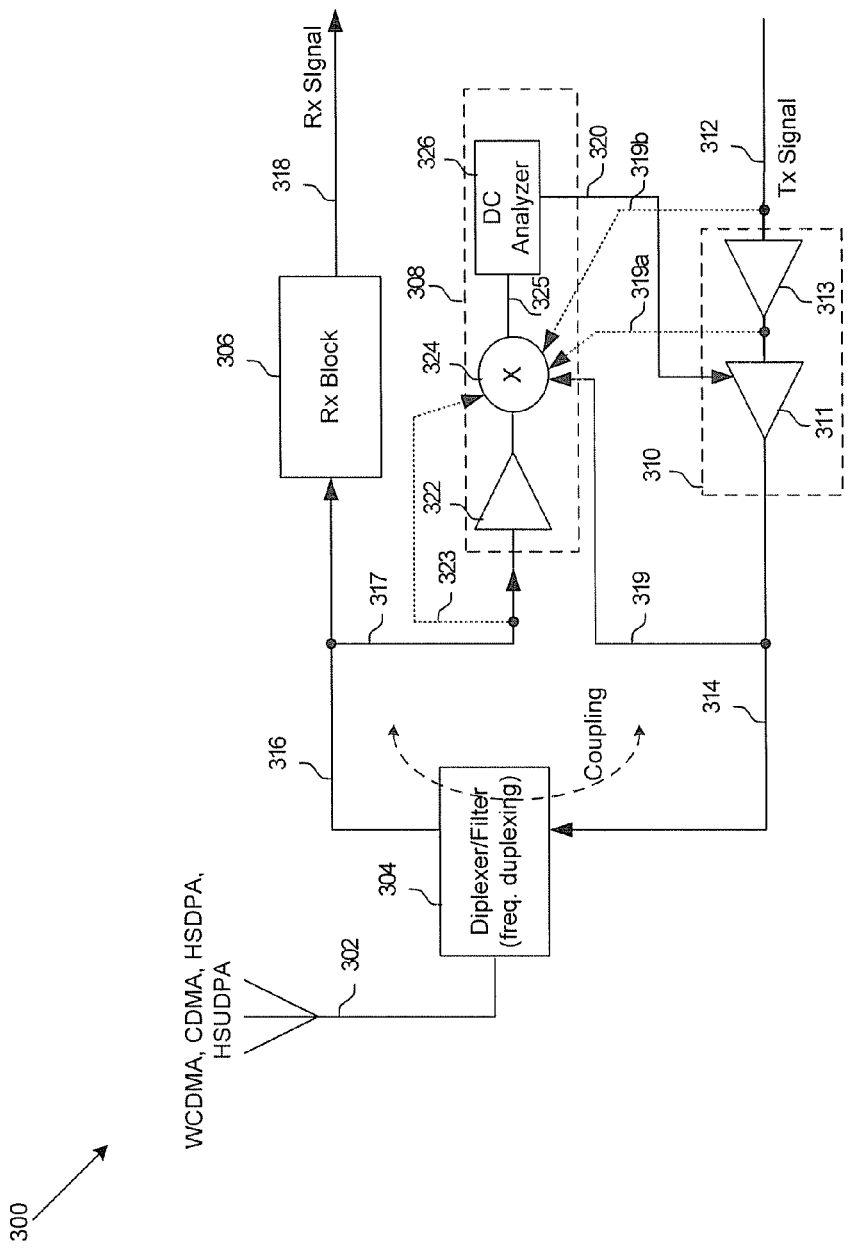
FIG. 3 is a block diagram of an exemplary wireless transceiver utilizing frequency duplexing and antenna pulling compensation, in accordance with an embodiment of the invention.

FIG. 3 is a block diagram of an exemplary wireless transceiver utilizing frequency duplexing and antenna pulling compensation, in accordance with an embodiment of the invention. Referring to FIG. 3, the wireless transceiver 300 may comprise an antenna 302, a diplexer 304, a RF receive (Rx) block 306, a RF transmit (Tx) block 310, and an analyzer block 308.

The Rx block 306 may comprise suitable logic, circuitry and/or code that may be adapted to amplify and convert the received analog RF signal 316 down to baseband frequency. In this regard, the Rx block 306 may comprise, for example, an analog-to-digital (A/D) converter that may be utilized to digitize the received analog baseband signal, as well as voltage controlled oscillator, a mixer, and/or a low pass filter. After the received signal 316 is downconverted to baseband frequency, the Rx block 106 may further process the downconverted signal and generate an output signal 318.

The Tx block 310 may comprise suitable logic, circuitry, and/or code that may be adapted to process an input signal 312 by utilizing, for example, filtering, amplification, and/or analog-to-digital (A/D) conversion operations. In this regard, the Tx block 310 may generate an output signal 314, which may be communicated to the antenna 302 for transmitting. In an exemplary embodiment of the invention, the Tx block 310 may comprise a power amplifier 311 and a pre-amplifier 313. The power amplifier 311 or the pre-amplifier 313 may be adapted to receive a control signal generated by the analyzer block 308, and may then change signal power of the transmit signal 314 based on the control signal 320.

The diplexer 304 may comprise suitable circuitry, logic and/or code and may be adapted to provide frequency duplexing to the Rx block 306 and the Tx block 310. In one embodiment of the invention, the diplexer 304 may comprise a filter, which may be adapted to simultaneously receive signal 316 via antenna 302 at a first frequency and transmit signal 314 via antenna 302 at a second frequency.

The analyzer block 308 may comprise a low noise amplifier (LNA) 322, a multiplier 324, and a DC analyzer 326, and may be adapted to analyze effects of antenna pulling and/or coupling within the transceiver system 300. For example, the analyzer block 108 may utilize portions of the transmitted signal 314 received by the Rx block 306 as a result of coupling, as well as the transmitted signal 314 to generate a control signal 120. For example, portions of the transmitted signal 314 received by the Rx block 306 as a result of coupling may be communicated to the analyzer block 308 via path 317 and may be buffered by the LNA 322. The buffered portions of the transmitted signal 314 received by the Rx block 306 may then be multiplied by the multiplier 324 with the transmitted signal 314, which may be communicated to the multiplier 324 via the path 319, located after the amplifier 311.

In an exemplary embodiment of the invention, the transmit signal 312 may be communicated to the multiplier 324, before amplification by amplifier 311 and generation of the signal 314, and after pre-amplification by pre-amplifier 313. In this regard, the transmit signal 312 may be pre-amplified by the pre-amplifier 313 and then may be communicated to the multiplier 324 via path 319a. In another exemplary embodiment of the invention, the transmit signal 312 may be communicated to the multiplier 324 prior to pre-amplification by the pre-amplifier 313, via path 319b.

The DC analyzer 326 may comprise suitable circuitry, logic and/or code and may be adapted to generate a control signal 320 based on the DC signal 325 communicated by the multiplier 324. The control signal 320 may be communicated to the Tx Block 310, and the Tx block 310 may utilize the control signal 320 to adjust one or more transmit characteristics to compensate for the effects of antenna pulling and/or signal coupling within the transceiver system 300. For example, the Tx block 310 may utilize the control signal 320 to adjust a power amplifier current of the power amplifier 311 within the Tx block 310, thereby adjusting the power of the transmitted output signal 314.

During an exemplary signal receive cycle, a signal 316 may be received via the antenna 302 and the diplexer 304 and may be communicated to the Rx block 306 for processing. For example, the Rx block 306 may comprise one or more RF processing blocks that may downconvert, filter, amplify, and/or digitize the received signal 316 to generate an output signal 318. Similarly, during an exemplary signal transmit cycle, the Tx block 310 may receive an input signal 312. The Tx block 310 may filter, upconvert, and/or amplify the input signal 312 to generate a transmit signal 314. The transmit signal 314 may be communicated to the diplexer 304 and then may be transmitted by the antenna 302.

The received signal 316 and the transmitted signal 314 may also be communicated to the analyzer block 308. Because of coupling effects between the Rx block 306 and the Tx block 310 via the diplexer 304, portions of the transmit signal 314 may be communicated to the Rx block 306 via the diplexer 304. In this regard, because of the effects of coupling, portions of the transmitted signal 314 may be communicated to the analyzer block 308 via path 317. For example, portions of the transmitted signal 314 may be communicated to the LNA 322 via path 317. The buffered portions of the transmitted signal 314 may then be communicated to the multiplier 324. The buffered portions of the transmitted signal 314 may then be multiplied by the multiplier 324 with the transmitted signal 314, which may be communicated to the multiplier 324 via the path 319. In this regard, by multiplying the transmitted signal 314 by itself, a DC bias signal 325 may be generated by the multiplier 325.

In an exemplary embodiment of the invention, portions of the transmitted signal 314 may be communicated directly to the multiplier 324 via paths 317 and 323, without buffering, or amplification by the LNA/buffer 322.

In instances when the antenna 302 and its associated power amplifier (PA) 311 within the Tx block 310 are operating properly, a known DC bias signal 325 may be generated by the multiplier 324 using the transmit signal 314 communicated via path 319 and portions of the transmitted signal communicated to the analyzer block 308 via path 317. The DC bias signal 325 generated by the multiplier 324 may be representative of the coupling between the Rx block 306 and the Tx block 310 via the antenna 302 and the diplexer 304. In instances where, for example, a hand is placed on the antenna 302 and pulling occurs, the DC bias generated by the analyzer block 108 may change. Accordingly, the analyzer block 308 may be adapted to dynamically monitor the DC bias signal 325 via the DC analyzer block 326.

The DC analyzer block 326 may generate a control signal 320 which may be communicated to the Tx block 310. The Tx block 310 may use the generated control signal 320 to adjust the power amplifier 311, and/or other circuitry within the Tx block 310, to maintain a specified DC bias in order to compensate for the antenna pulling effect. For example, in instances when the DC analyzer block 326 detects a change in the DC bias signal 325, the analyzer block may generate a control signal 320 which may be used by the Tx block 310 to adjust the amount of current supplied to the power amplifier 311, thereby increasing or decreasing transmit power of the transceiver system 300. In this regard, a desired DC bias may be achieved and the effects of pulling on the antenna 302 may be minimized.

Figure 4:
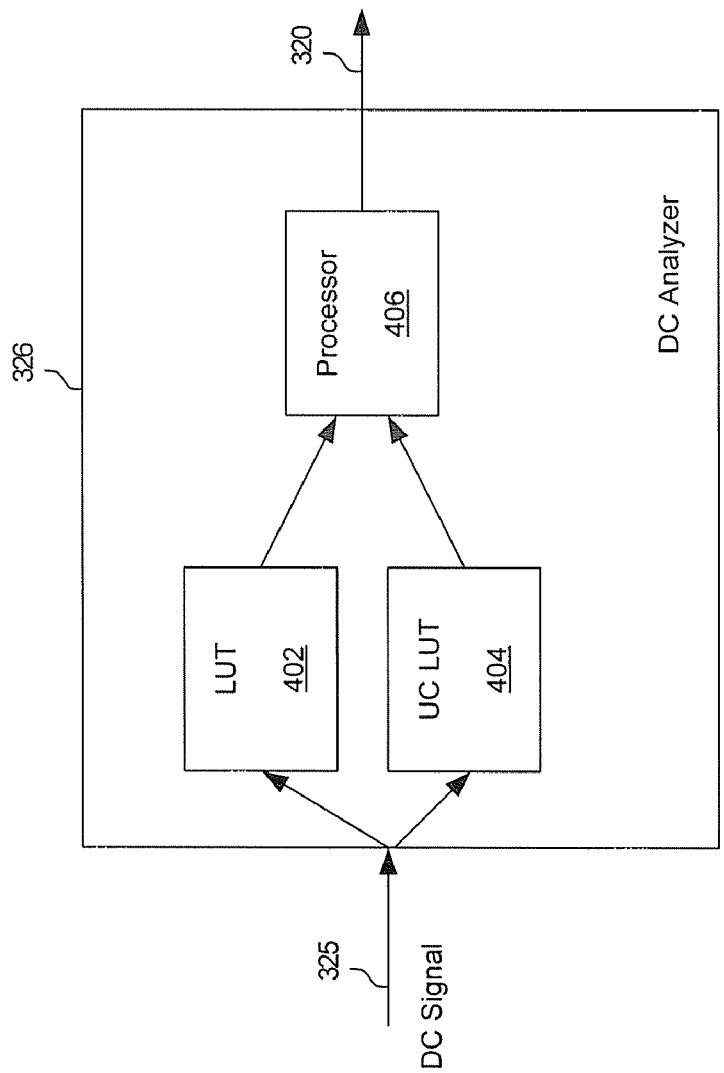
FIG. 4 is a block diagram of a DC analyzer block that may be utilized in accordance with an embodiment of the invention.

FIG. 4 is a block diagram of a DC analyzer block that may be utilized in accordance with an embodiment of the invention. Referring to FIG. 4, there is illustrated the DC analyzer block 326 of FIG. 3. The DC analyzer block 326 may comprise a look-up table (LUT) 402, a user-customizable look-up table (UCLUT) 404, and a processor 406.

The LUT 402 may comprise suitable circuitry, logic and/or code and may be used to provide a look-up value of the control signal 320 based on the received DC bias signal 325. For example, the look-up table 402 may provide a look-up value corresponding to a current level supplied to the amplifier 311 of FIG. 3, based on the received DC bias signal 325. The entries in the look-up table 402 may be pre-programmed and may be implemented in hardware and/or software.

In one embodiment of the invention, the DC analyzer block 326 may also utilize the user-customizable look-up table 404. The UCLUT 404 may be customized, for example, by a user of the wireless transceiver 300. In this regard, look-up entries for the UCLUT 404 may be entered and/or changed by a user of the wireless transceiver 300. After the LUT 402 or the UCLUT 404 selects a look-up entry based on the received DC bias signal 325, the selected look-up entry may be communicated to the processor 406 for further processing. The processor 406 may generate the control signal 320 based on the look-up entry received from the LUT 402 or the UCLUT 404.

Figure 5:
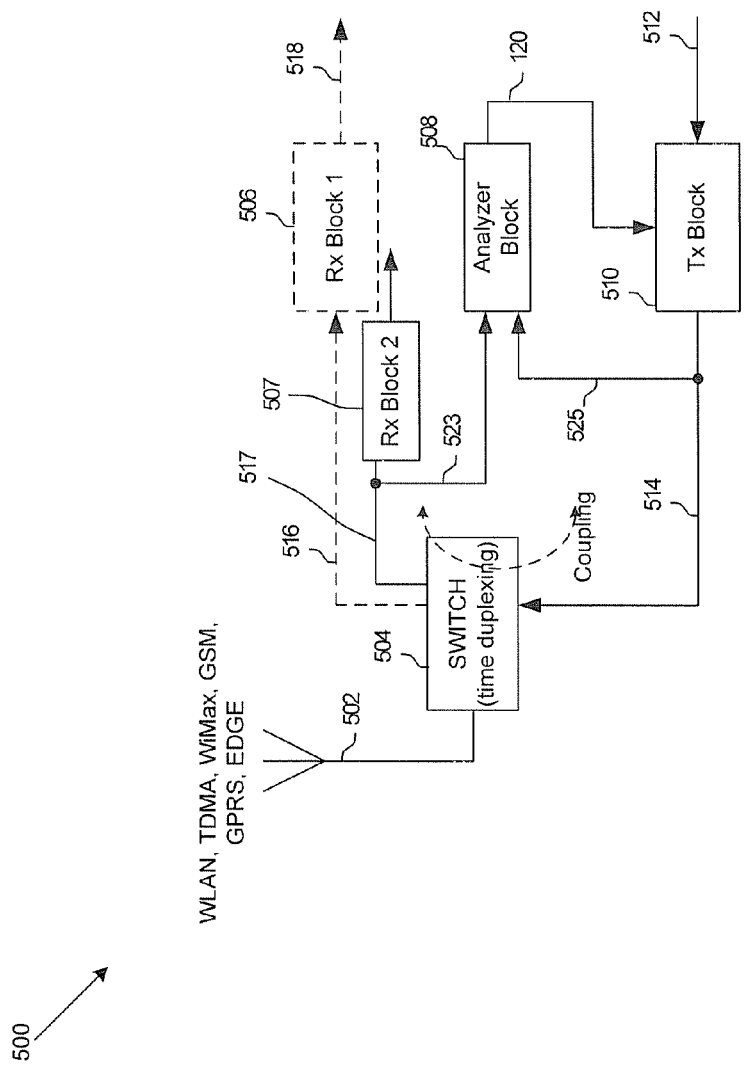
FIG. 5 is a block diagram of an exemplary wireless transceiver utilizing time duplexing and antenna pulling compensation, in accordance with an embodiment of the invention.

FIG. 5 is a block diagram of an exemplary wireless transceiver utilizing time duplexing and antenna pulling compensation, in accordance with an embodiment of the invention. Referring to FIG. 5, the wireless transceiver 500 may comprise an antenna 502, a switch 504, a first RF receive (Rx) block 506, a second Rx block 507, a RF transmit (Tx) block 510, and an analyzer block 508.

The Rx block 506 may comprise suitable logic, circuitry and/or code that may be adapted to amplify and convert the received analog RF signal 516 down to baseband frequency. In this regard, the Rx block 506 may comprise, for example, an analog-to-digital (A/D) converter that may be utilized to digitize the received analog baseband signal, as well as voltage controlled oscillator, a mixer, and/or a low pass filter. After the received signal 516 is downconverted to baseband frequency, the Rx block 506 may further process the downconverted signal and generate an output signal 518.

The Tx block 510 may comprise suitable logic, circuitry, and/or code that may be adapted to process an input signal 512 by utilizing, for example, filtering, amplification, and/or analog-to-digital (A/D) conversion operations. In this regard, the Tx block 510 may generate an output signal 514, which may be communicated to the antenna 502 for transmitting. The switch 504 may comprise suitable circuitry, logic and/or code and may be adapted to provide time duplexing of signals, such as a TDMA signal, a WLAN signal, a WiMax signal, a GSM signal, a GPRS signal, and/or an EDGE signal, for example, to the Rx blocks 506, 507 and the Tx block 510.

The analyzer block 508 may comprise suitable circuitry, logic and/or code and may be adapted to analyze effects of antenna pulling and/or coupling within the transceiver system 500. Since processing of TDMA/WLAN/WiMax/GSM/GPRS/EDGE signals by the wireless transceiver 500 is based on time duplexing, whenever the Tx block 510 is transmitting a signal 514, the Rx block 506 is inactive, and vice versa. In instances when the Tx block 510 is transmitting a signal 514 and the Rx block 506 is inactive, the wireless transceiver 500 may activate the second Rx block 507. The second Rx block 507 may be utilized to receive signal portions 517 of the transmitted signal 514 as a result of coupling between the transmit and receive circuitry of the transceiver 500.

The portion 517 of the transmitted signal 514 may be communicated to the analyzer block 508 for processing. The analyzer block 508 may utilize the signal portions 517 of the transmitted signal 514 received by the Rx block 507 as a result of coupling, as well as the transmitted signal 514 to generate a control signal 520. The control signal 520 may be communicated to the Tx Block 510, and the Tx block 510 may utilize the control signal 520 to adjust one or more transmit characteristics to compensate for the effects of antenna pulling and/or signal coupling. For example, the Tx block 510 may utilize the control signal 520 to adjust a power amplifier current of power amplifier circuitry within the Tx block 510, thereby adjusting the power of the transmitted output signal 514.

In operation, the wireless transceiver 500 may be utilized to transmit and receive a TDMA signal, a WLAN signal, a WiMax signal, a GSM signal, a GPRS signal, and/or an EDGE signal based on time duplexing, using the switch 504. During an exemplary signal receive cycle, a signal 516 may be received via the antenna 502 and the switch 504 and may be communicated to the Rx block 506 for processing. Similarly, the Tx block 510 may receive an input signal 512. The Tx block 510 may filter, upconvert, and/or amplify the input signal 512 to generate a transmit signal 514. The transmit signal 514 may be communicated to the switch 504 and then may be transmitted by the antenna 502.

In instances when the Tx block 510 may be transmitting a signal 514 and the Rx block 506 may be inactive, the wireless transceiver 500 may activate the second Rx block 507 for purposes of analyzing DC bias level and coupling effects between the receiver and transmitter circuitry of the wireless transceiver 500. Because of coupling effects between the Rx block 507 and the Tx block 510 via the switch 504, signal portions 517 of the transmit signal 514 may be communicated to the Rx block 507 via the switch 504. In this regard, because of the effects of Tx/Rx coupling, signal portions 517 of the transmitted signal 514 may be communicated to the analyzer block 508 via path 523. In addition, the transmitted signal 514 may be communicated to the analyzer block 508 via path 525.

In instances when the antenna 502 and its associated power amplifier (PA) circuitry within the Tx block 510 are operating properly, a known DC bias may be generated by the analyzer block 508 using the transmit signal 514 communicated via path 525 and signal portions 517 of the transmitted signal 514 communicated to the analyzer block 508 via path 523. The DC bias generated by the analyzer block 508 may be representative of the coupling between the Rx block 507 and the Tx block 510 via the antenna 502 and the switch 504. In instances where, for example, a hand is placed on the antenna 502 and pulling occurs, the DC bias generated by the analyzer block 508 may change. Accordingly, the analyzer block 508 may be adapted to dynamically monitor the DC bias. The analyzer block 508 may then generate a control signal 520 which may be communicated to the Tx block 510, in a similar way as described above with regard to FIG. 1.

Figure 6:
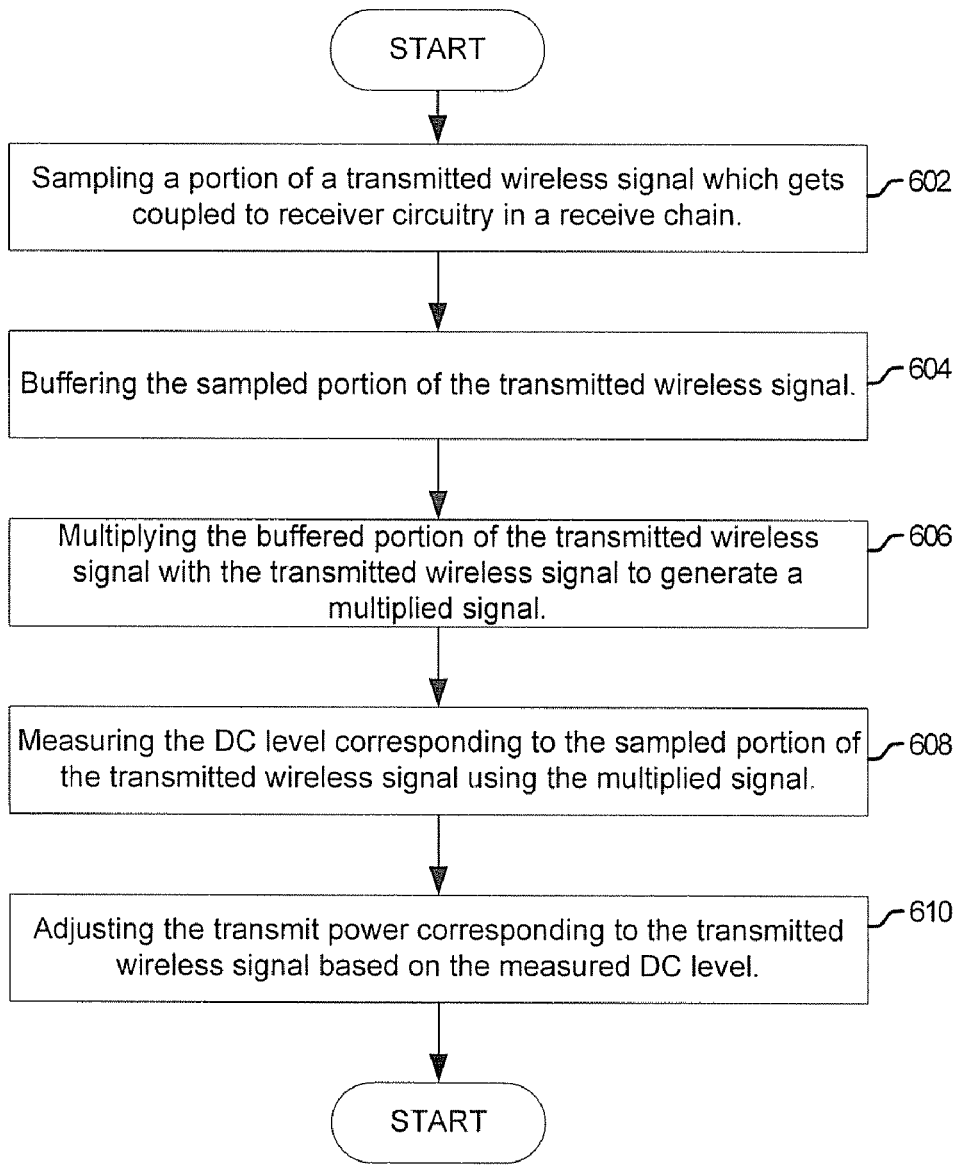
FIG. 6 is a flow diagram illustrating exemplary steps for processing signals in a wireless transceiver, in accordance with an embodiment of the invention.

FIG. 6 is a flow diagram illustrating exemplary steps for processing signals in a wireless transceiver, in accordance with an embodiment of the invention. Referring to FIGS. 3 and 6, at 602, a signal portion 316 of a transmitted wireless signal 314, which gets coupled to receiver circuitry such as Rx block 306 in a receive chain, may be sampled by the analyzer block 308. At 604, the sampled portion 316 of the transmitted wireless signal 314 may be buffered by the LNA 322 within the analyzer block 308. At 606, the buffered portion 316 of the transmitted wireless signal 314 may be multiplied with the transmitted wireless signal 314 to generate a multiplied signal 325, using the multiplier 324. At 608, the DC bias level corresponding to the sampled portion 316 of the transmitted wireless signal 314 may be measured by the DC analyzer block 326 using the multiplied signal 325. At 610, the transmit power of the PA 311 within the Tx block 310, corresponding to the transmitted wireless signal 314, may be adjusted based on the measured DC level and the control signal 320 generated by the DC analyzer block 326.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
    sampling, within a transceiver that comprises transmitter circuitry and receiver circuitry, a portion of a transmitted wireless signal which gets coupled to said receiver circuitry in a receive chain of said transceiver during transmission of said wireless signal via an antenna, wherein at least a portion of said receiver circuitry in said receive chain is separate from said transmitter circuitry in a transmit chain of said transceiver;
    measuring a DC level corresponding to said sampled portion of said transmitted wireless signal;
    adjusting transmit power corresponding to said transmitted wireless signal, based on said measured DC level;
    buffering said sampled portion of said transmitted wireless signal; and
    multiplying said buffered portion of said transmitted wireless signal with said transmitted wireless signal to generate a multiplied signal.

2. The method according to claim 1, comprising measuring said DC level using said multiplied signal.

3. A method for wireless communication, the method comprising:
    sampling, within a transceiver that comprises transmitter circuitry and receiver circuitry, a portion of a transmitted wireless signal which gets coupled to said receiver circuitry in a receive chain of said transceiver during transmission of said wireless signal via an antenna, wherein at least a portion of said receiver circuitry in said receive chain is separate from said transmitter circuitry in a transmit chain of said transceiver;
    measuring a DC level corresponding to said sampled portion of said transmitted wireless signal;
    adjusting transmit power corresponding to said transmitted wireless signal, based on said measured DC level; and
    if said transmitted wireless signal comprises one or more of a TDMA signal, a WLAN signal, a WiMax signal, a GSM signal, a GPRS signal, and/or an EDGE signal, sampling said portion of said transmitted wireless signal via second receiver circuitry in a second receive chain.

4. A system for wireless communication, the system comprising:
    at least one processor that enables sampling, within a transceiver that comprises transmitter circuitry and receiver circuitry, of a portion of a transmitted wireless signal which gets coupled to said receiver circuitry in a receive chain of said transceiver during transmission of said wireless signal via an antenna, wherein at least a portion of said receiver circuitry in said receive chain is separate from said transmitter circuitry in a transmit chain of said transceiver;
    said at least one processor enables measuring of a DC level corresponding to said sampled portion of said transmitted wireless signal;
    said at least one processor enables adjusting of transmit power corresponding to said transmitted wireless signal, based on said measured DC level, wherein said at least one processor enables buffering of said sampled portion of said transmitted wireless signal; and wherein said at least one processor enables multiplying of said buffered portion of said transmitted wireless signal with said transmitted wireless signal to generate a multiplied signal.

5. The system according to claim 4, wherein said at least one processor enables measuring of said DC level using said multiplied signal.

6. A system for wireless communication, the system comprising:

at least one processor that enables sampling, within a transceiver that comprises transmitter circuitry and receiver circuitry, of a portion of a transmitted wireless signal which gets coupled to said receiver circuitry in a receive chain of said transceiver during transmission of said wireless signal via an antenna, wherein at least a portion of said receiver circuitry in said receive chain is separate from said transmitter circuitry in a transmit chain of said transceiver;

said at least one processor enables measuring of a DC level corresponding to said sampled portion of said transmitted wireless signal;

said at least one processor enables adjusting of transmit power corresponding to said transmitted wireless signal, based on said measured DC level; and if said transmitted wireless signal comprises one or more of a TDMA signal, a WLAN signal, a WiMax signal, a GSM signal, a GPRS signal, and/or an EDGE signal, said at least one processor enables sampling of said portion of said transmitted wireless signal via second receiver circuitry in a second receive chain.

7. A non-transitory computer-readable medium having stored thereon, a computer program having at least one code section for wireless communication, the at least one code section being executable by a machine for causing the machine to perform steps comprising:

sampling, within a transceiver that comprises transmitter circuitry and receiver circuitry, a portion of a transmitted wireless signal which gets coupled to said receiver circuitry in a receive chain of said transceiver during transmission of said wireless signal via an antenna, wherein at least a portion of said receiver circuitry in said receive chain is separate from said transmitter circuitry in a transmit chain of said transceiver;

measuring a DC level corresponding to said sampled portion of said transmitted wireless signal;

adjusting transmit power corresponding to said transmitted wireless signal, based on said measured DC level, wherein said at least one code section comprises code for buffering said sampled portion of said transmitted wireless signal; and wherein said at least one code section comprises code for multiplying said buffered portion of said transmitted wireless signal with said transmitted wireless signal to generate a multiplied signal.

8. The non-transitory computer-readable medium according to claim 7, wherein said at least one code section comprises code for measuring said DC level using said multiplied signal.

9. A non-transitory computer-readable medium having stored thereon, a computer program having at least one code section for wireless communication, the at least one code section being executable by a machine for causing the machine to perform steps comprising:

sampling, within a transceiver that comprises transmitter circuitry and receiver circuitry, a portion of a transmitted wireless signal which gets coupled to said receiver circuitry in a receive chain of said transceiver during transmission of said wireless signal via an antenna, wherein at least a portion of said receiver circuitry in said receive chain is separate from said transmitter circuitry in a transmit chain of said transceiver;

measuring a DC level corresponding to said sampled portion of said transmitted wireless signal;

adjusting transmit power corresponding to said transmitted wireless signal, based on said measured DC level; and wherein said at least one code section comprises code for sampling said portion of said transmitted wireless signal via second receiver circuitry in a second receive chain, if said transmitted wireless signal comprises one or more of a TDMA signal, a WLAN signal, a WiMax signal, a GSM signal, a GPRS signal, and/or an EDGE signal.

\* \* \* \* \*